(12) United States Patent
Hu et al.

(10) Patent No.: US 12,376,049 B2
(45) Date of Patent: Jul. 29, 2025

(54) DISCOVERY BURST TRANSMISSION WINDOW DESIGN

(71) Applicant: Samsung Electronics Co., Ltd., Suwon-si (KR)

(72) Inventors: Liang Hu, San Diego, CA (US); Jung Hyun Bae, San Diego, CA (US); Yuan-Sheng Cheng, San Diego, CA (US); Philippe Jean Marc Michel Sartori, Naperville, IL (US)

(73) Assignee: Samsung Electronics Co., Ltd., Yongin-si (KR)

( * ) Notice: Subject to any disclaimer, the term of this patent is extended or adjusted under 35 U.S.C. 154(b) by 358 days.

(21) Appl. No.: 17/684,274

(22) Filed: Mar. 1, 2022

(65) Prior Publication Data
US 2022/0303925 A1    Sep. 22, 2022

Related U.S. Application Data

(60) Provisional application No. 63/215,295, filed on Jun. 25, 2021, provisional application No. 63/187,315, (Continued)

(51) Int. Cl.
*H04W 56/00* (2009.01)
*H04L 27/26* (2006.01)
(Continued)

(52) U.S. Cl.
CPC ..... *H04W 56/001* (2013.01); *H04L 27/26025* (2021.01); *H04W 16/28* (2013.01); *H04W 74/0816* (2013.01)

(58) Field of Classification Search
CPC .......... H04W 56/001; H04W 16/28; H04W 74/0816; H04W 16/14; H04W 48/12;
(Continued)

(56) References Cited

U.S. PATENT DOCUMENTS 10,764,851 B2    9/2020  Kerhuel et al.
10,979,274 B2    4/2021  Pan et al.
(Continued)

OTHER PUBLICATIONS

"3rd Generation Partnership Project; Technical Specification Group Radio Access Network; NR; Physical layer procedures for control (Release 16)," 3GPP, 2020, pp. 1-181.
(Continued)

*Primary Examiner* — Obaidul Huq
(74) *Attorney, Agent, or Firm* — Lewis Roca Rothgerber Christie LLP

(57) ABSTRACT

A system and method for managing a Discovery Burst Transmission Window in a wireless communication system. In some embodiments, the method includes: receiving, by a User Equipment (UE), a first Signal Synchronization Block (SSB); decoding a first Physical Broadcast Channel (PBCH) from the first SSB; determining, from a Master Information Block (MIB) of the first PBCH, a first beam value; determining, from the first PBCH, a first candidate Synchronization Signal/Physical Broadcast Channel (SS/PBCH) block index; and calculating a first SS/PBCH block index as A mod Q, wherein A is the first candidate SS/PBCH block index and Q is the first beam value.

20 Claims, 20 Drawing Sheets

Related U.S. Application Data filed on May 11, 2021, provisional application No. 63/164,369, filed on Mar. 22, 2021.

(51) Int. Cl.
*H04W 16/28* (2009.01)
*H04W 74/0816* (2024.01)

(58) Field of Classification Search
CPC ............... H04W 48/16; H04W 72/046; H04W 74/0808; H04W 74/006; H04W 74/008; H04L 27/26025; H04L 5/0053; H04L 27/2656; H04L 27/2659; H04L 27/266
USPC .......................................... 370/464, 498, 503
See application file for complete search history.

(56) References Cited

U.S. PATENT DOCUMENTS

| | | |
|---|---|---|
| 2020/0413356 A1 | 12/2020 | Wang et al. |
| 2021/0022096 A1 | 1/2021 | Rane et al. |
| 2021/0136800 A1 | 5/2021 | Li et al. |
| 2021/0377883 A1* | 12/2021 | Jung ..................... H04W 48/10 |
| 2022/0286983 A1* | 9/2022 | Yoshimura .......... H04W 56/001 |
| 2023/0029702 A1* | 2/2023 | Harada ............... H04W 56/001 |
| 2023/0224836 A1* | 7/2023 | Wu ....................... H04W 72/04 370/503 |
| 2023/0327723 A1* | 10/2023 | Pan ................... H04W 56/0015 370/329 |

OTHER PUBLICATIONS

Ad-Hoc Chair (Ericsson): "Session notes for 8.2 (Study on supporting NR from 52.6 GHz to 71 GHz)," 3GPP, Tdoc R1-2102192, Feb. 2021, 14 pages.

Moderator (Intel Corporation): "Summary #4 of email discussion on initial access aspect of NR extension up to 71 GHz," 3GPP, R1-2101971, Feb. 2020, 197 pages.

EPO Extended European Search Report dated Aug. 2, 2022, issued in corresponding European Patent Application No. 22162714.4 (13 pages).

\* cited by examiner

| subCarrierSpacingCommon | spare | $N_{SSB}^{QCL}$ |
|---|---|---|
| scs15or60 | 0 | 16 |
| scs15or60 | 1 | 32 |
| scs30or120 | 0 | 64 |
| scs30or120 | 1 | reserved |

FIG. 6

| Frequency range | SS block frequency position $SS_{REF}$ | GSCN | Range of GSCN |
|---|---|---|---|
| 0 – 3000 MHz | N * 1200kHz + M * 50 kHz<br>N={1,2499}, M={1,3,5} (Default M=3) | 3N + (M-3)/2 | 2 – 7498 |
| 3000 – 24250 MHz | 3000 MHz + N * 1.44 MHz<br>N= 0:14756 | 7499 + N | 7499 – 22255 |
| 24250 – 100000 Mhz | 24250.08 MHz + N * 17.28 MHz,<br>N = 0:4383 | 22256 + N | 22256 – 26639 |

FIG. 14

| NR Operating Band | SS Block SCS | SS Block pattern[1] | Range of GSCN (First – <Step size> – Last) |
|---|---|---|---|
| n257 | 120 kHz | Case D | 22388 – <1> – 22558 |
|  | 240 kHz | Case E | 22390 – <2> – 22556 |
| n258 | 120 kHz | Case D | 22257 – <1> – 22443 |
|  | 240 kHz | Case E | 22258 – <2> – 22442 |
| n260 | 120 kHz | Case D | 22995 – <1> – 23166 |
|  | 240 kHz | Case E | 22996 – <2> – 23164 |
| n261 | 120 kHz | Case D w/o DBTW | 22446 – <2> – 22491 |
|  | 120 kHz | Case D w DBTW | 22447 – <2> – 22492 |
|  | 240 kHz | Case E | 22446 – <2> – 22490 |

FIG. 15

Option 1:

| Features | Index | Feature group | Components | Prerequisite feature groups | Field name in TS 38.331 [2] | Parent IE in TS 38.331 [2] | Need of FDD/TDD differentiation | Need of FR1/FR2/FR3 differentiation | Note | Mandatory/ Optional |
|---|---|---|---|---|---|---|---|---|---|---|
| X. Beyond 52GHz communication | X-Y | UE supports from receiving from gNB using LBT/ no LBT | 1) UE supports operating with a gNB using LBT 2) UE supports operating with a gNB using non-LBT | X-1 | n/a | n/a | n/a | Applicable for FR3 only | At least one of 1) or 2) needs to be signalled. If UE supports X-1, UE shall report X-Y | Mandatory without capability signaling |

Option 2:

| Features | Index | Feature group | Components | Prerequisite feature groups | Field name in TS 38.331 [2] | Parent IE in TS 38.331 [2] | Need of FDD/TDD differentiation | Need of FR1/FR2/FR3 differentiation | Note | Mandatory/ Optional |
|---|---|---|---|---|---|---|---|---|---|---|
| X. Beyond 52GHz communication | X-Y1 | UE supports from receiving from gNB using LBT | 1) UE supports operating with a gNB using LBT | X-1 | n/a | n/a | n/a | Applicable for FR3 only | If UE supports X-1, UE shall report on of X-Y1 or X-Y2 | Optional with capability signaling |
| X. Beyond 52GHz communication | X-Y2 | UE supports from receiving from gNB not using LBT | 1) UE supports operating with a gNB not using LBT | X-1 | n/a | n/a | n/a | Applicable for FR3 only | If UE supports X-1, UE shall report on of X-Y1 or X-Y2 | Optional with capability signaling |

FIG. 17

| SIB2 | |
|---|---|
| cellReselectionInfoCommon | Common information for intra-frequency, inter-frequency and/or inter-RAT cell re-selections |
| cellReselectionServingFreqInfo | Common information for inter-frequency and inter-RAT cell re-selections |
| intraFreqCellReselectionInfo | Common information for intra-frequency cell re-selections |
| DBTW flag of neighboring cells | {0 1 1 0 0 1}, where each "0" or "1" is the DBTW status for one neighboring cell |

FIG. 18

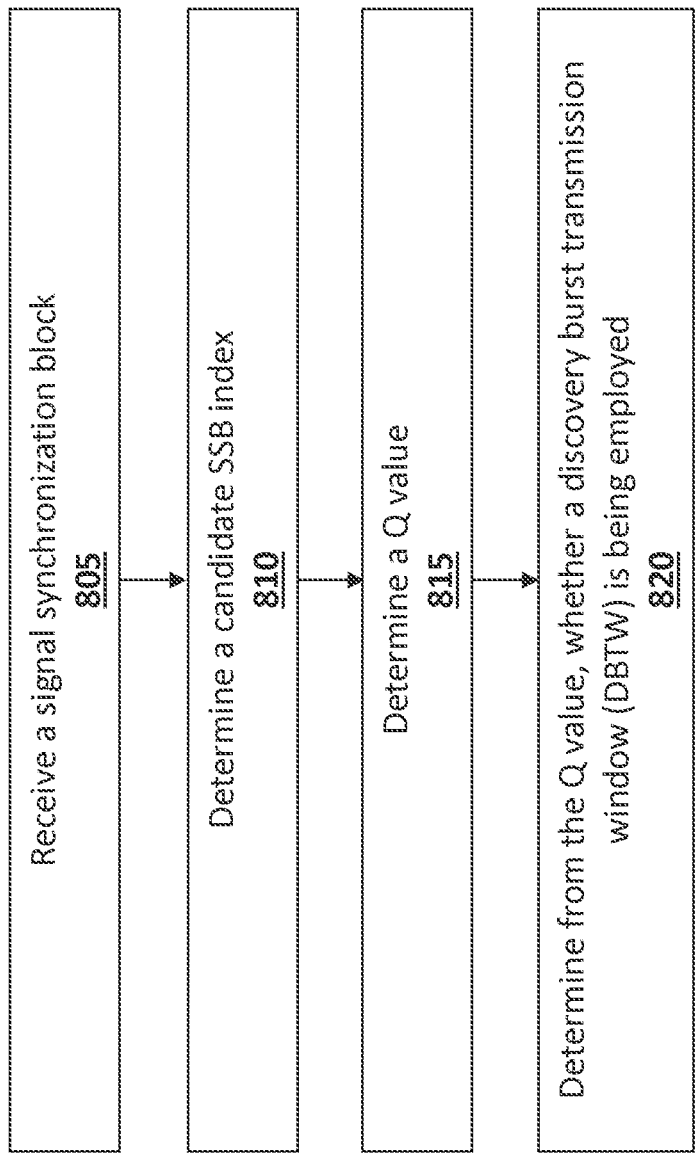

DISCOVERY BURST TRANSMISSION WINDOW DESIGN

CROSS-REFERENCE TO RELATED APPLICATION(S)

The present application claims priority to and the benefit of U.S. Provisional Application No. 63/164,369, filed Mar. 22, 2021, entitled "DISCOVERY BURST TRANSMISSION WINDOW DESIGN ON NR B52", and priority to and the benefit of U.S. Provisional Application No. 63/187,315, filed May 11, 2021, entitled "DISCOVERY BURST TRANSMISSION WINDOW DESIGN ON NR B52", and priority to and the benefit of U.S. Provisional Application No. 63/215,295, filed Jun. 25, 2021, entitled "INITIAL ACCESS METHOD FOR MILLIMETER-WAVE UNLICENSED SYSTEMS", the entire content of both of which is incorporated herein by reference.

FIELD

One or more aspects of embodiments according to the present disclosure relate to wireless communication, and more particularly to a system and method for managing a Discovery Burst Transmission Window in a wireless communication system.

BACKGROUND

In some regions, Listen Before Talk is mandated in unlicensed portions of the radio spectrum. When Listen Before Talk is required, a network node (gNB) may forego transmitting one or more Signal Synchronization Blocks (SSBs) in complying with Listen Before Talk. In such a situation, the gNB may employ a Discovery Burst Transmission Window (DBTW), within which the foregone SSBs may be transmitted later. A User Equipment UE may then receive one or more of such later-transmitted SSBs.

It is with respect to this general technical environment that aspects of the present disclosure are related.

SUMMARY

According to an embodiment of the present disclosure, there is provided a method, including: receiving, by a User Equipment (UE), a first Signal Synchronization Block (SSB); decoding a first Physical Broadcast Channel (PBCH) from the first SSB; determining, from a Master Information Block (MIB) of the first PBCH, a first beam value; determining, from the first PBCH, a first candidate Synchronization Signal/Physical Broadcast Channel (SS/PBCH) block index; and calculating a first SS/PBCH block index as A mod Q, wherein A is the first candidate SS/PBCH block index and Q is the first beam value.

In some embodiments, the method further includes: receiving, by the UE, a second SSB; decoding a second PBCH from the second SSB; determining, from a MIB of the second PBCH, a second beam value; and determining, from the second beam value, whether a discovery burst transmission window (DBTW) is being employed.

In some embodiments, the method includes: determining that the second beam value is equal to a predetermined value, and determining, based on the second beam value being equal to the predetermined value, that a DBTW is not being employed.

In some embodiments, the method includes: determining that the second beam value is not equal to a predetermined value, determining, based on the second beam value not being equal to the predetermined value, that a DBTW is being employed, and determining, from the second beam value, a number of beams in the DBTW.

In some embodiments, the method further includes obtaining system information, wherein the obtaining is performed based on the determination of whether a DBTW is being employed.

In some embodiments, the method further includes: determining, from the second PBCH, a second candidate SS/PBCH block index; and determining a second SS/PBCH block index, based on the second candidate SS/PBCH block index and based on the second beam value.

In some embodiments, the determining of the second SS/PBCH block index includes inferring the second SS/PBCH block index based on the order of candidate SS/PBCH block index values being reversed within a second DBTW, the second DBTW being associated with, and following, a first DBTW.

In some embodiments, the method further includes receiving a DBTW-identifying bit associated with the first SSB, the DBTW-identifying bit specifying whether the first SSB is within a first DBTW or a second DBTW of two associated DBTWs.

In some embodiments, the DBTW-identifying bit is a bit of the MIB.

In some embodiments, the DBTW-identifying bit is sub-CarrierSpacingCommon.

In some embodiments: the first beam value is greater than 32, and the method includes: receiving a first plurality of SSBs in a first DBTW; and receiving a second plurality of SSBs in a second DBTW.

According to an embodiment of the present disclosure, there is provided a User Equipment (UE), including: a radio; and a processing circuit, the processing circuit being configured to: receive a first signal synchronization block (SSB); decode a first Physical Broadcast Channel (PBCH) from the first SSB; determine, from a Master Information Block (MIB) of the first PBCH, a first beam value; determine, from the first PBCH, a first candidate Synchronization Signal/Physical Broadcast Channel (SS/PBCH) block index; and calculate a first SS/PBCH block index as A mod Q, wherein A is the first candidate SS/PBCH block index and Q is the first beam value.

In some embodiments, the processing circuit is further configured to: receive a second SSB; decode a second PBCH from the second SSB; determine, from a MIB of the second PBCH, a second beam value; and determine, from the second beam value, whether a discovery burst transmission window (DBTW) is being employed.

In some embodiments, the processing circuit is configured to: determine that the second beam value is equal to a predetermined value, and determine, based on the second beam value being equal to the predetermined value, that a DBTW is not being employed.

In some embodiments, the processing circuit is configured to: determine that the second beam value is not equal to the predetermined value, determine, based on the second beam value not being equal to the predetermined value, that a DBTW is being employed, and determine, from the second beam value, a number of beams in the DBTW.

In some embodiments, the processing circuit is further configured to obtain system information, wherein the obtaining is performed based on the determination of whether a DBTW is being employed.

In some embodiments, the processing circuit is further configured to: determine, from the second PBCH, a second candidate SS/PBCH block index; and determine a second SS/PBCH block index, based on the second candidate SS/PBCH block index and based on the second beam value.

In some embodiments, the determining of the second SS/PBCH block index includes inferring the second SS/PBCH block index based on the order of candidate SS/PBCH block index values being reversed within a second DBTW, the second DBTW being associated with, and following, a first DBTW.

In some embodiments, the processing circuit is further configured to receive a DBTW-identifying bit associated with the first SSB, the DBTW-identifying bit specifying whether the first SSB is within a first DBTW or a second DBTW of two associated DBTWs, wherein the DBTW-identifying bit is subCarrierSpacingCommon.

According to an embodiment of the present disclosure, there is provided a User Equipment (UE), including: a radio; and means for processing, the means for processing being configured to: receive a signal synchronization block (SSB); decode a Physical Broadcast Channel (PBCH) from the SSB; determine, from a Master Information Block (MIB) of the PBCH, a beam value; and determine, from the beam value, whether a discovery burst transmission window (DBTW) is being employed.

BRIEF DESCRIPTION OF THE DRAWINGS

These and other features and advantages of the present disclosure will be appreciated and understood with reference to the specification, claims, and appended drawings wherein:

FIG. 6 is a table of $N_{SSB}^{QCL}$, according to an embodiment of the present disclosure;

FIG. 14 is a table of Global Synchronization Channel Number (GSCN), according to an embodiment of the present disclosure;

FIG. 15 is a table of Global Synchronization Channel Number (GSCN), according to an embodiment of the present disclosure;

FIG. 17 is a table of options for defining UE capability, according to an embodiment of the present disclosure;

FIG. 18 is a table of System Information Block 2 (SIB2) parameters, according to an embodiment of the present disclosure;

FIG. 19 is a flowchart, according to an embodiment of the present disclosure.

DETAILED DESCRIPTION

The detailed description set forth below in connection with the appended drawings is intended as a description of exemplary embodiments of a system and method for managing a Discovery Burst Transmission Window in a wireless communication system provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

When a New Radio-Unlicensed (NR-U) User Equipment (UE) operates in the 5/6 GHz band, it knows that the access is always unlicensed. For the band at 52 GHz (B52 GHz), the situation is not as simple, and it may be advantageous for the UE to determine whether it is a licensed or shared carrier. When operating in a licensed band, or in an unlicensed band without listen before talk (LBT), the Discovery Burst Transmission Window (DBTW) may be disabled. Also, it may be advantageous to define the UE behavior and the assumptions the UE may make regarding the window before the UE knows whether it is operating in a licensed or unlicensed part or whether LBT is on or off in regions where LBT is not mandated. A User Equipment (UE) may be a user device, such as a mobile telephone, a WiFi hotspot, or a laptop computer equipped with a mobile broadband adapter.

Figure 1:
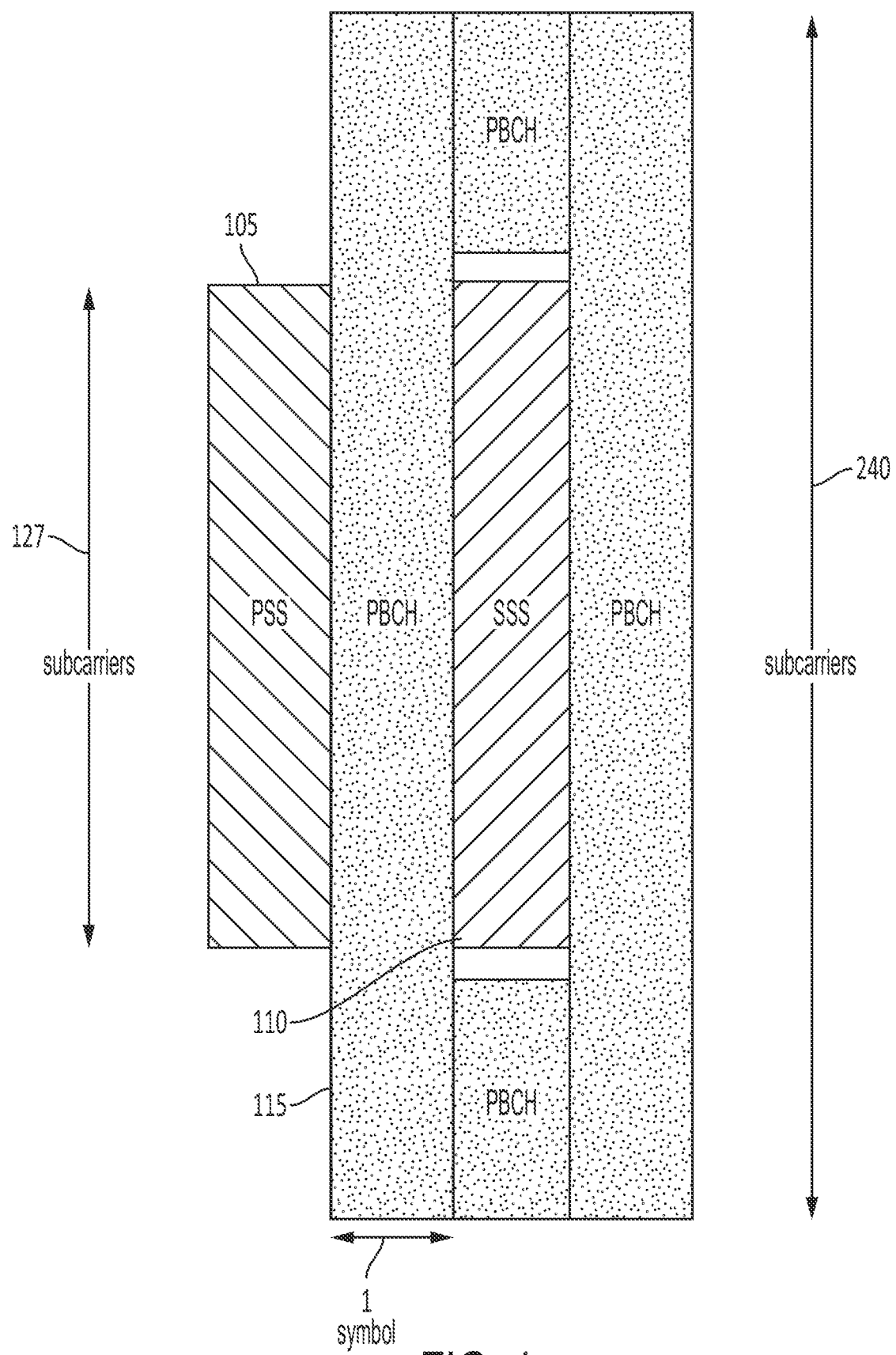
FIG. 1 is a resource diagram for a Signal Synchronization Block (SSB), according to an embodiment of the present disclosure.

FIG. 1 shows the structure of a Synchronization Signal Block (SSB, or SS block), in some embodiments. In the licensed portions of the spectrum, synchronization and initial access are based on the definition of the SS block. The SSB is a self-contained block that enables the UE to acquire synchronization and initial information. The SSB contains the following: (i) a Primary Synchronization Signal (PSS) 105, which is used to coarsely synchronize in frequency and time, (ii) a Secondary Synchronization Signal (SSS) 110, which is used to finely synchronize and acquire time, and (iii) the Physical Broadcast Channel (PBCH) 115, which contains the minimum information necessary for a UE to access the system.

Figure 2:
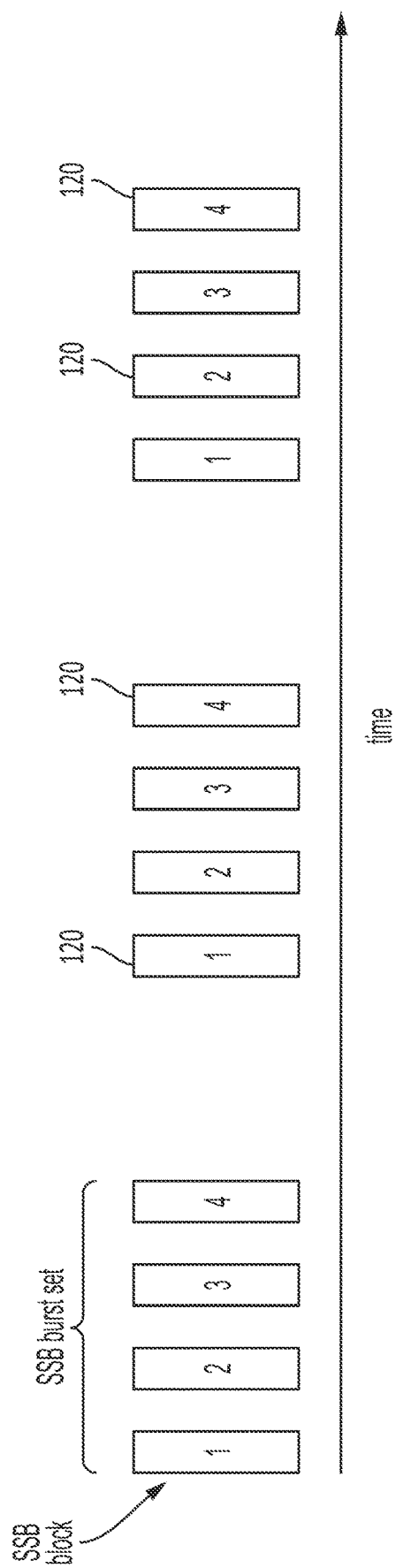
FIG. 2 is an illustration of an SSB burst set structure, according to an embodiment of the present disclosure.

The SSBs may be organized into an SSB burst set, the structure of which is shown in FIG. 2. The SSB burst set comprises several SSBs 120. In case of beamforming, each SSB of an SSB burst set may be associated with an antenna beam. Antenna beam k is associated with SSB k. The SSB burst set is periodically repeated. The maximum value of k may be referred to as Q, or as the "beam value". More generally (as discussed in further detail below), Q, or the beam value, may be equal to (i) the maximum value of k (also referred to as $N_{SSB}^{QCL}$) or (ii) a reserved value (e.g., Q=0) indicating that DBTW is disabled.

The duration of an SSB burst set may be 5 ms. Each SSB is transmitted periodically with a periodicity between 5 ms and 20 ms on a carrier on which a UE performs initial access, and each SSB can be transmitted in any half slot. As such, an SSB burst with a Subcarrier Spacing (SCS) of 120 kHz includes up to 5/(0.125/2))=80 possible locations.

The SSB location within an SSB burst set may be derived as follows: (i) some bits are transmitted in the PBCH (SS-block time index): 0 bits for Frequency Range 1 (FR1) (licensed), and 3 bits for Frequency Range 2 (FR2), and (ii) for FR2, 3 bits from the scrambling sequence index of the Demodulation Reference Signal (DMRS), which also indicates the SSB-block time index. Up to 8 scrambling patterns can be used, thereby corresponding to 3 bits. Consequently, for FR, up to 64 values for the beam index can be encoded.

For NR-U, a different process may be used. First, a discovery burst (DB) is defined. The discovery burst comprises the SSB and the System Information Block 1 (SIB1). The SSB and the SIB1 are multiplexed in frequency, whereas there is no such requirement when operating in licensed spectrum. Given that LBT is performed to transmit the DB, a time window is provided within which the UE can expect to receive the DB. For the DB transmission, LBT Type 2A is performed. This presents the advantage that once the UE starts transmitting the discovery burst it can transmit it until the end of the window.

Figure 3:
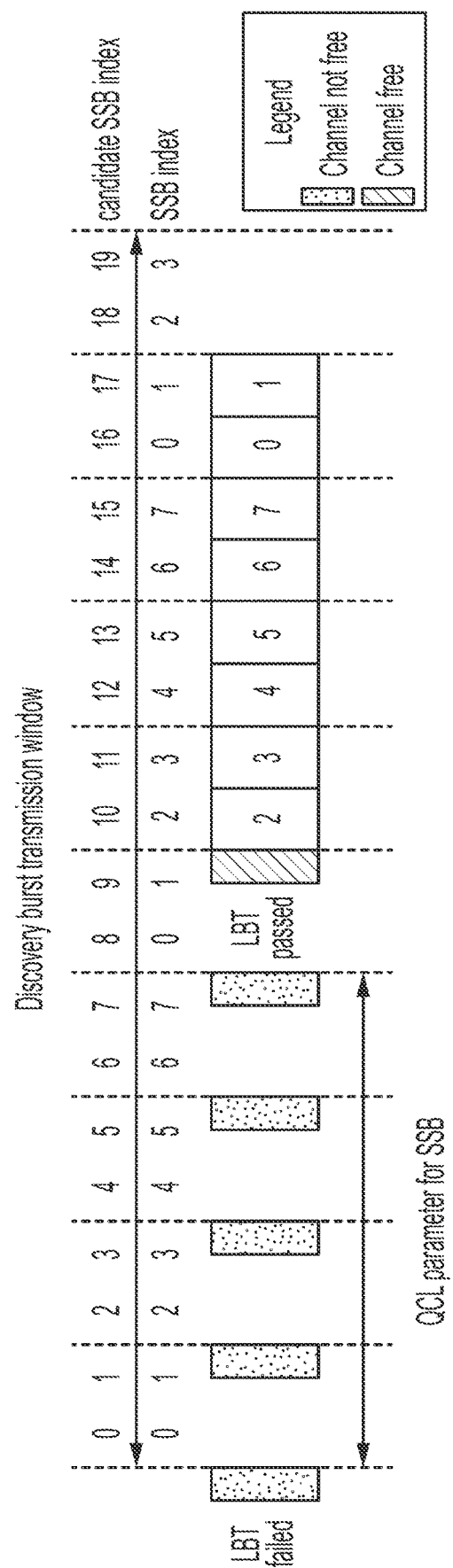
FIG. 3 is an illustration of a Discovery Burst Transmission Window (DBTW), according to an embodiment of the present disclosure.

The SS-block index is used, but in a different way: the transmission of the SSB-block requires a gNB to perform LBT. The LBT process might fail, thereby resulting in the SSB not always being transmitted at the beginning of the SSB burst set. The SS-block index is used to indicate the offset (in terms of number of half slots) from the theoretical starting point of the SSB burst set. This is illustrated in FIG. 3. The SS block index comprises 1 or 2 bits in the PBCH, and the scrambling sequence index of the PBCH can be used, thus resulting in up to 32 encoded values.

For FR2, the Quasi Co-Location (QCL) is linked to the SSB location. There is a one-to-one correspondence between the SSB location and the beam index. For NR-U, such a process is not feasible, thus the QCL assumptions are determined based on the PBCH DMRS index.

Figure 4:
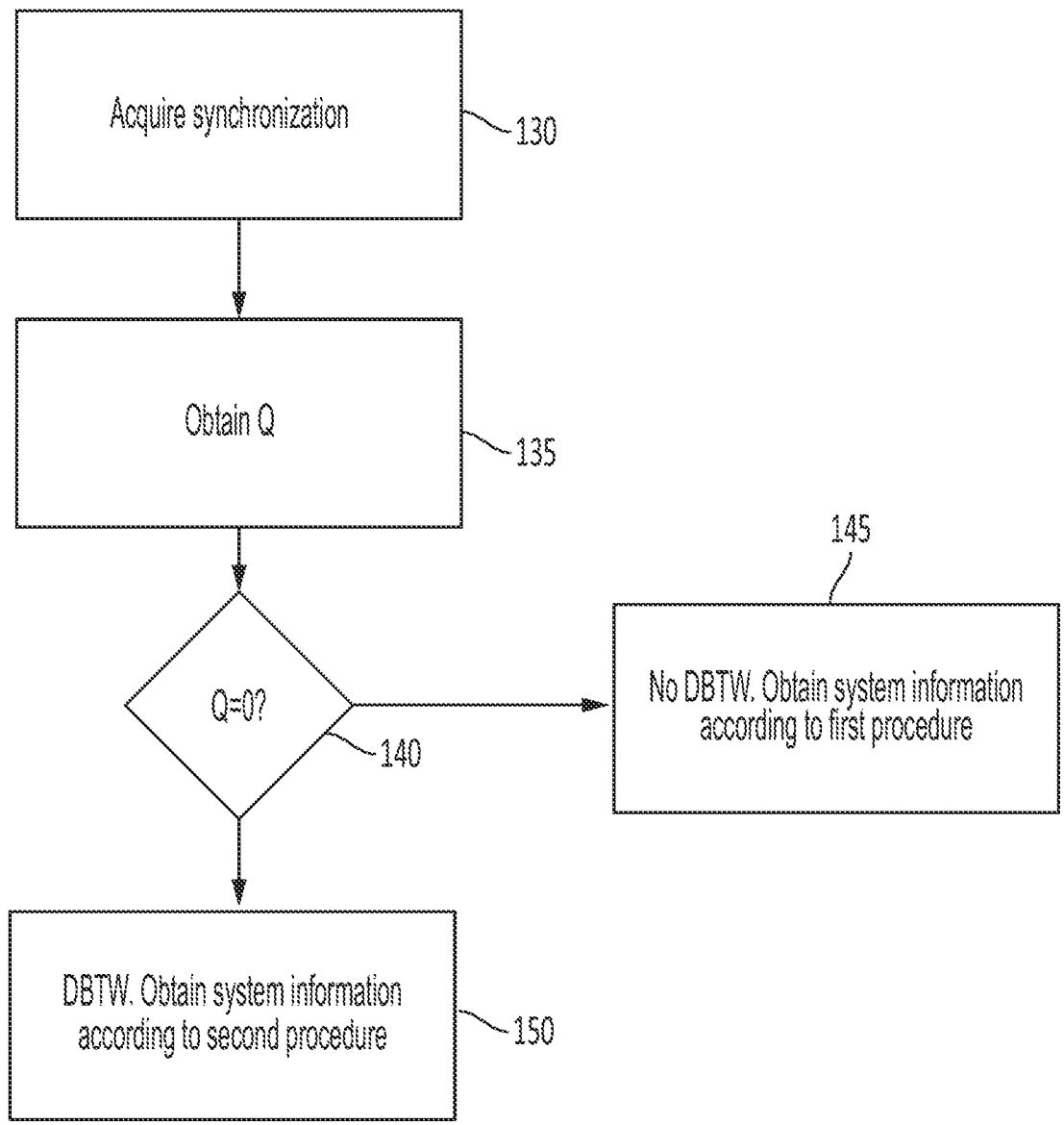
FIG. 4 is a flowchart, according to an embodiment of the present disclosure.

In some embodiments, a specific value for Q is signaled. A specific, e.g., reserved value (e.g., Q=0) indicates that the gNB operates without DBTW. A second value, or set of values, indicates that the gNB operates with a DBTW. Such an embodiment is shown in FIG. 4. In the first phase (at 130), the UE acquires synchronization through the usual procedures. For instance, it can obtain a primary synchronization signal (PSS) for coarse synchronization, and then a secondary synchronization signal (SSS) for fine synchronization, and finally obtain the PBCH payload. As long as the UE knows the number of bits of the PBCH, it does not need to know the exact format of the PBCH. The UE then obtains Q, at 135, and determines, at 140, whether Q=0, and, if Q=0, it obtains, at 145, system information according to a first procedure (which may involve receiving one or more SSBs of an SSB burst set (as illustrated in FIG. 2)). If the UE determines, at 140, that Q is not equal to zero, it concludes that a DBTW is in use, and obtains, at 150, system information according to a second procedure (e.g., based on methods described herein).

Several methods of obtaining Q may be employed. For instance, in a first embodiment, Q is fully signaled in the PBCH. For example, Q may be encoded using 2 bits to indicate which of a set of four candidate Q values (e.g., 0, 8, 32, 64) is used. Possible bits are the bits sub CarrierSpacingCommon and ssb-SubcarrierOffset. In a second embodiment, Q is signaled in the System Information Block 1 (SIB1). In such a case, there is no bit indicating Q in the PBCH. After obtaining the PBCH, the UE has the necessary information to decode the Remaining Minimum System Information (RMSI), and can then obtain SIB1 with the usual procedures (by monitoring the search space indicated in the PBCH looking for a DCI scrambled with System Information Radio Network Temporary Identifier (SI-RNTI), and obtaining the associated PDSCH). A field in the SIB1 is used to indicate Q. In such an embodiment, more than 2 bits may be used to indicate Q.

In a third embodiment, Q is partially signaled in the PBCH and partially signaled in the SIB1. In such an embodiment, one bit (or more) is used in the PBCH to signal some bits of Q (e.g., the most significant bit (MSB)). The same bits as for indicating Q for NR-U are used (the least significant bit (LSB) of ssb-SubcarrierOffset). The remaining bits are indicated in SIB1.

In a fourth embodiment, Q is partially signaled in the PBCH and partially implicitly determined. One bit is indicated in the PBCH as explained above. The remaining bits are not indicated in the SIB1, but are obtained by observing the SSB burst.

In one embodiment, when only one bit for Q is used in the PBCH, this bit can indicate whether there is a DBTW. For instance, if the bit in the PBCH indicates 0, there is no DBTW. If the bit in the PBCH indicates 1, there is a DBTW.

More generally, the value of Q may be used by the UE to infer whether there is a DBTW. For example, Q=0 may be a reserved value signaling to the UE that there is no DBTW. The candidate SSB index may then be calculated by the UE as follows: candidate SSB index=DMRS sequence number+3 bits in PBCH payload. In some embodiments, Q is signaled in the MIB payload as in Rel-16, or in SIB1 in ServingCellConfigCommonSIB.

In some embodiments, the UE acquires PBCH and processes it as it does in Frequency Range 2 (FR2) for Release-16 (Rel-16) of the 5G specification set of the 3rd Generation Partnership Project (3GPP). In Rel-16 NRU, the value of Q is specified to be one of the following: 1, 2, 4, 8, and cannot be an arbitrary number. For B52, for an SCS of 120, in some embodiments, Q=8, 32, 64. A value of Q of 8 or 32 may be handled by the Rel-16 NRU framework. The case Q=64, which is the max Q value in the 3GPP Work Item (WI) scope, may be handled separately.

If the UE obtains a value for Q that is different from 0, it can then assume that there is a DBTW. The UE may then use a different time of processing and determination of the timing and QCL assumptions (discussed in further detail below).

For a SCS of 120 kHz, the maximum size of DBTW is 5 ms, which includes 80 candidate SSB positions beyond the maximum candidate SSB index 64. When Q=64, four different methods may be employed (referred to herein as Option 1 through Option 4, respectively) in four corresponding embodiments.

When Q is larger than 32 (and less than or equal to 64), one option is to use additional bits in the PBCH, or in the SIB1 to extend the solution for Q≤32. However, in some embodiments, the UE, by monitoring over several DBTWs, can determine both the QCL assumptions, and resolve the timing ambiguity. In the following, several solutions are described assuming that Q=64, and also considering the general 32<Q<64.

In the embodiment referred to as Option 1, the candidate SSB index position wraps around within the same DBTW (e.g., a first DBTW) and the SSB index wraps around in the next DBTW (e.g., a second DBTW, associated with the first DBTW) if needed. As used herein, an index may be said to "wrap around" within a DBTW if, within the window, (i) the index is incremented until it has reached its maximum value, and then resets to its minimum value and continues to be incremented or (ii) the index is decremented until it has reached its minimum value, and then resets to its maximum value and continues to be decremented. As used herein, a first DBTW and a second DBTW may be said to be "associated" with each other if the SSBs transmitted in the second DBTW are affected by the SSBs transmitted in the first DBTW, and if the SSB index or the candidate SSB index within the second DBTW are affected by the SSB index or the candidate SSB index within the first DBTW. As used herein, "SSB index" is a synonym for "SS/PBCH block index" and "candidate SSB index" is a synonym for "candidate SS/PBCH block index".

Figure 5:
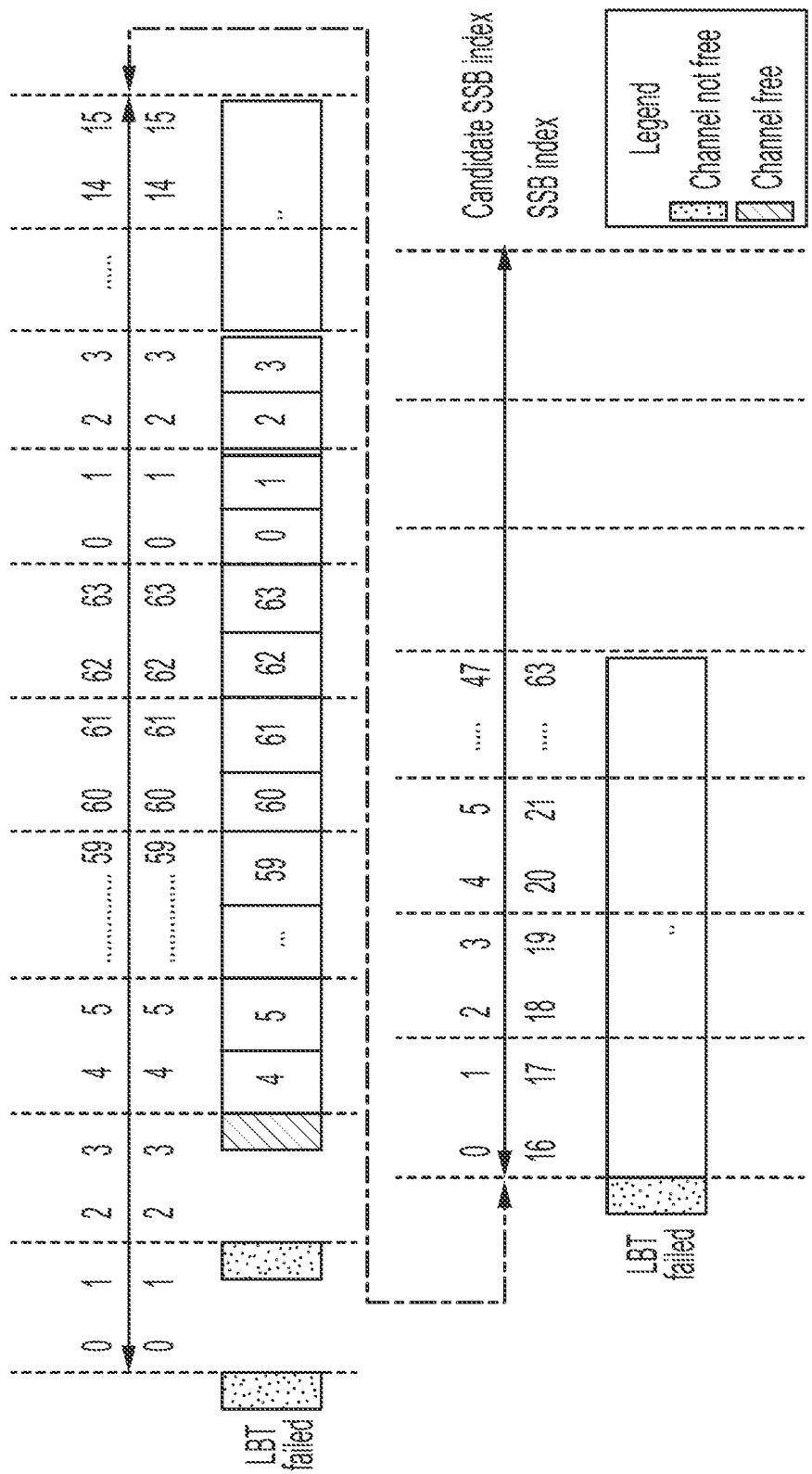
FIG. 5 is a DBTW timing diagram, according to an embodiment of the present disclosure.

With such a solution, the DBTW can be fully utilized for SSB sweeping. If not all the SSB indexes are completely swept in the first DBTW due to an LBT failure, the beam sweep may continue in the second DBTW which starts from SSB index 16 and finishes in SSB index 63. The UE may detect the wrapped around candidate SSB index 0 to 15 after SSB index 63 in the first DBTW and if needed continue to detect the SSB candidate position from SSB index 16 to SSB index 63 in the second DBTW. In FIG. 5, the SSB sweeping is completed within the first DBTW and SSB beam sweeping in the second DBTW is not needed. In FIG. 5 (and in several other drawings discussed below, each showing two DBTWs), a second DBTW is shown below a first DBTW, instead of being drawn side-by-side in time order, for ease of illustration. Alternatively, the candidate SSB index within the DBTW may continue increasing without wrapping around. The candidate SSB index across DBTW's may or may not reset.

The candidate SSB index in the DBTW may be referred to as A, or as $\bar{\kappa}$. A super DBTW may then be defined to consist of a first DBTW (which may be referred to as DBTW1) and a second DBTW (which may be referred to as DBTW2), where DBTW1 and DBTW2 together indicate the full set of SSB beams with a maximum of 128 candidate positions. DBTW1 and DBTW2 together contain the maximum of 128 candidate positions and the maximum of 64 SSB indexes. For Q=64 or a general 80>Q>64, a UE assumes that SS/PBCH blocks in a serving cell that are within a same super discovery burst transmission window or across super discovery burst transmission windows are quasi co-located with respect to average gain, QCL-TypeA, and QCL-TypeD properties, when applicable, if a value of A is same among the SS/PBCH blocks for A in DBTW1, and if a value of ((A+16) mod Q) is same among the SS/PBCH blocks for A in DBTW2 if DBTW2 is needed and configured. For general Q, 32<Q<64, for the first DBTW, the value of (A mod Q) is the same among the SS/PBCH blocks, whereas, for the second DBTW, the value of ((A+A') mod Q) is the same among the SS/PBCH blocks, if A resets in the second DBTW, where A' is the final index in the first DBTW. For the second DBTW, the value of (A mod Q) is the same among the SS/PBCH blocks, if A does not reset in the second DBTW. For A in DBTW1 or DBTW2, A is an index of the candidate SSB position in DBTW1 which is indicated by (i) the index of the DMRS scrambling sequence transmitted in a PBCH of a corresponding SS/PBCH block, and (ii) three bits in the MIB. Q is either provided by ssb-PositionQCL-r17 in SIB3 or SIB4 or, if ssb-PositionQCL-r17 is not provided, obtained from 2 bits in a MIB provided by an SS/PBCH block or 2 bits in the SIB1 which is QCL'ed with the SSB, e.g., in ServingCellConfigCommonSIB. Similarly, the indication of the candidate SSB index in DBTW1 or DBTW 2 can be transmitted in the PBCH or SIB1 via a single bit, and then the frame timing can also be determined. The timing determination of whether the UE is monitoring the first DBTW or the second DBTW may be explicitly indicated using one bit, e.g., subCarrierSpacingCommon. Such a bit, which indicates to the UE whether an SSB is in the first DBTW or the second DBTW, may be referred to as a "DBTW-identifying bit".

In general, in some embodiments disclosed herein, for operation with shared spectrum channel access in FR2-2, a UE assumes that SS/PBCH blocks in a serving cell that are within a same discovery burst transmission window or across discovery burst transmission windows are quasi co-located with respect to average gain, quasi co-location 'typeA' and 'typeD' properties, when applicable, if a value of ($\bar{\iota}$ mod $N_{SSB}^{QCL}$) is same among the SS/PBCH blocks, where I is the candidate SS/PBCH block index. $N_{SSB}^{QCL}$ is either provided by ssb-PositionQCL or, if ssb-PositionQCL is not provided, obtained from a MIB provided by a SS/PBCH block according to the table of FIG. 6. The UE can determine an SS/PBCH block index according to ($\bar{\iota}$ mod $N_{SSB}^{QCL}$). The UE assumes that within a discovery burst transmission window, a number of transmitted SS/PBCH blocks on a serving cell is not larger than $N_{SSB}^{QCL}$ and a number of transmitted SS/PBCH blocks with a same SS/PBCH block index is not larger than one. When Lmax=64 and $N_{SSB}^{QCL}$=64, there is a one-to-one mapping between SSB candidate index and SSB index, and no DBTW is configured.

Figure 7:
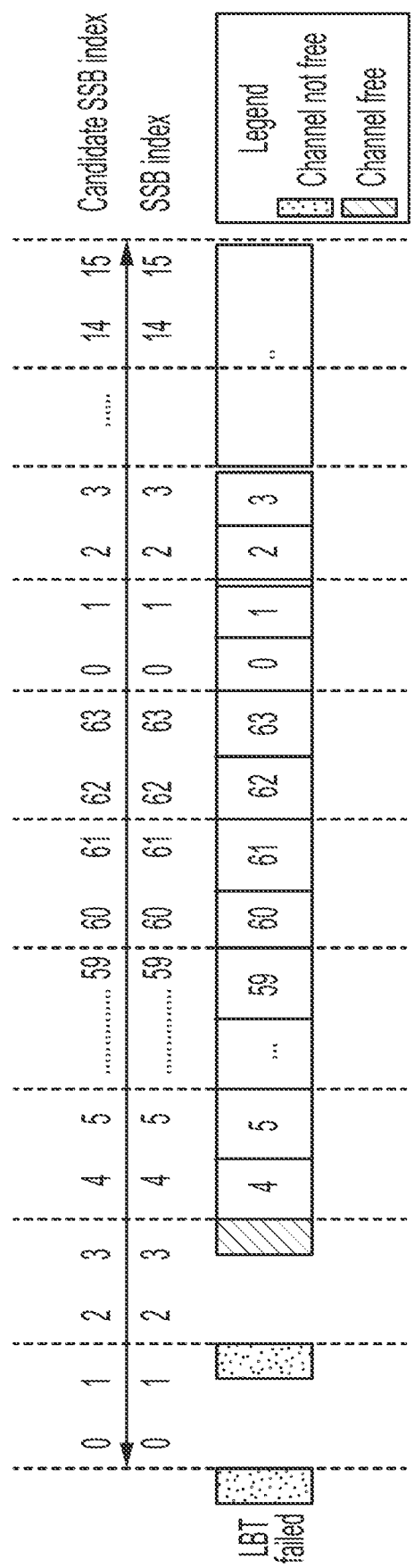
FIG. 7 is a DBTW timing diagram, according to an embodiment of the present disclosure.

In the embodiment referred to as Option 2, the candidate SSB index may be wrapped around so that the DBTW can be fully utilized for SSB sweeping. Only one DBTW is defined, at the expense of more complexity and more bookkeeping. The UE may detect the wrapped around candidate SSB index 0 to 15 after SSB index 63. Alternatively, the candidate SSB index within the DBTW may continue increasing without wrapping around. This is illustrated in FIG. 7.

Figure 8:
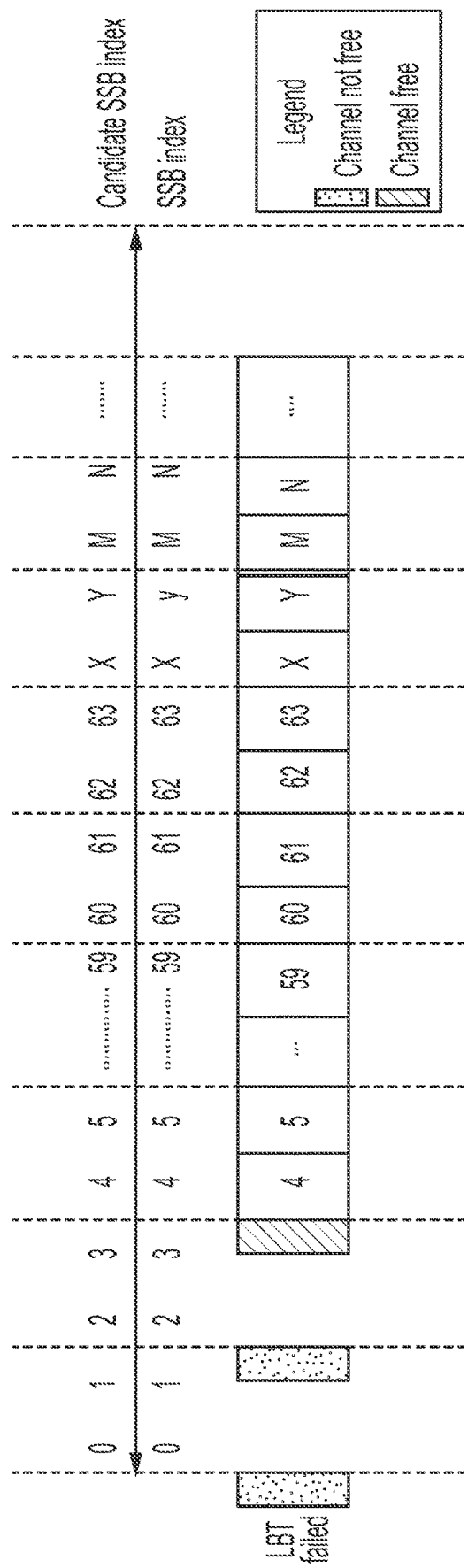
FIG. 8 is a DBTW timing diagram, according to an embodiment of the present disclosure.

For Q=64, a UE assumes that SS/PBCH blocks in a serving cell that are within a same discovery burst transmission window or across discovery burst transmission windows are quasi co-located with respect to average gain, QCL-TypeA, and QCL-TypeD properties, when applicable, if a value of A is same among the SS/PBCH blocks. For general Q, 32<Q<64, for the first DBTW, the value of (A mod Q) is the same among the SS/PBCH blocks, A is an index of the candidate SSB position in the DBTW which is indicated by (i) the index of the DMRS scrambling sequence transmitted in a PBCH of a corresponding SS/PBCH block and (ii) three bits in MIB. Similarly, the indication of the wrap around candidate SSB indexes may be transmitted in the PBCH or in a SIB1 via a single bit, and then the frame timing may also be determined. The timing determination of whether the UE is monitoring the first DBTW or the second DBTW may be explicitly indicated using one bit, e.g., subCarrierSpacingCommon. This is illustrated in FIG. 8.

Figure 9:
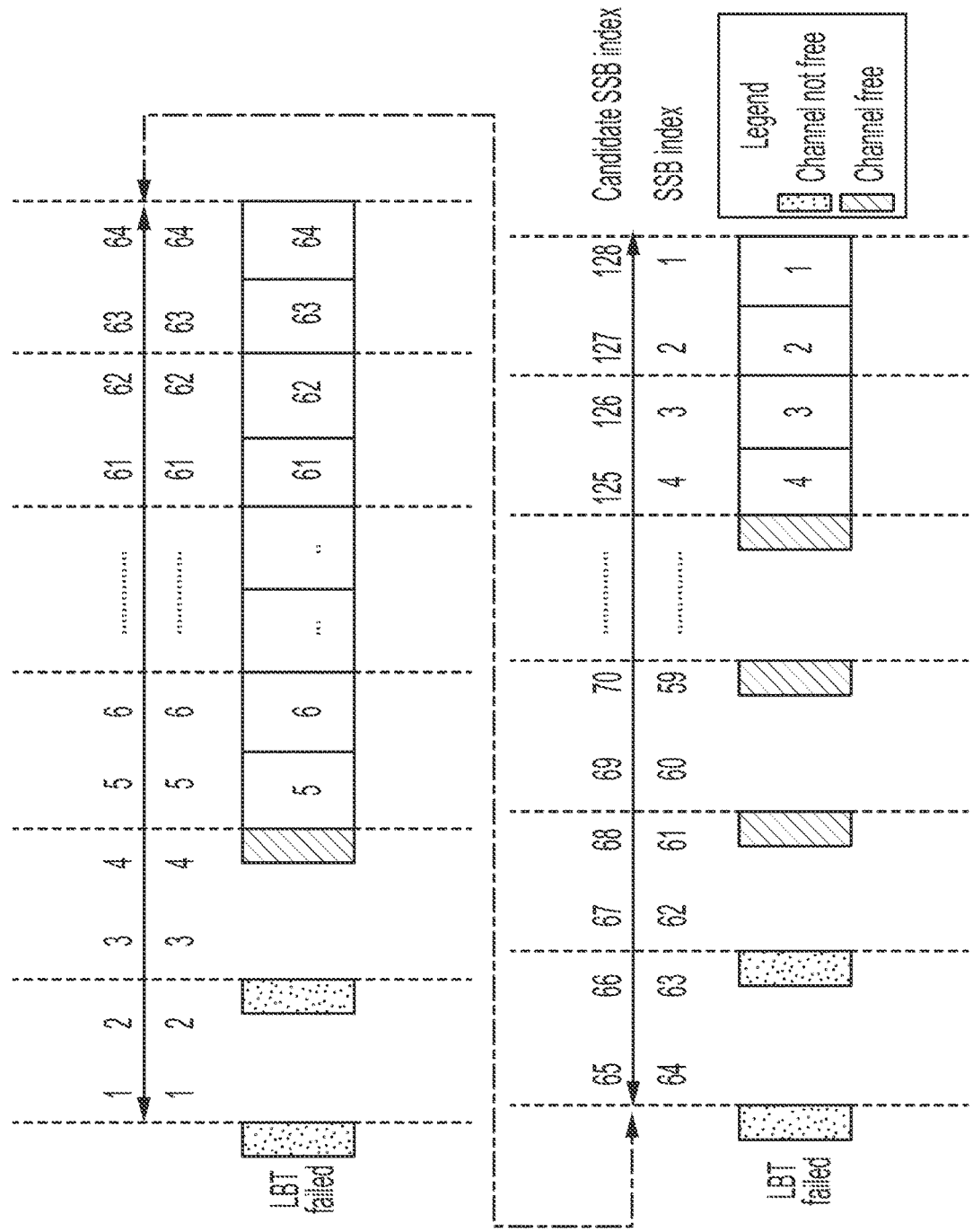
FIG. 9 is a DBTW timing diagram, according to an embodiment of the present disclosure.

In the embodiment referred to as Option 3, the legacy candidate SSB index in the DBTW may be kept. In the second DBTW, the order of the SSB indexes may be reversed. This embodiment provides a simple way to determine both the QCL assumptions and the timing. The candidate SSB index across DBTW's may or may not reset. This is illustrated in FIG. 9.

A super DBTW may be defined to consist of a first DBTW (which may be referred to as DBTW1) and a second DBTW (which may be referred to as DBTW2), where DBTW1 and DBTW2 together indicate the full set of SSB beams with a maximum of 128 candidate positions. DBTW1 and DBTW2 together contain the maximum of 128 candidate positions and the maximum of 64 SSB indexes. For Q=64, a UE assumes that SS/PBCH blocks in a serving cell that are within a same super discovery burst transmission window or across super discovery burst transmission windows are quasi co-located with respect to average gain, QCL-TypeA, and QCL-TypeD properties, when applicable, if the following conditions are met: (i) for the first DBTW, the value of A is the same among the SS/PBCH blocks, and (ii) for the second DBTW, the value of Q−A−1 is the same among the SS/PBCH blocks.

For general Q, 32<Q<64 the conditions are: (i) for the first DBTW, the value of (A mod Q) is the same among the SS/PBCH blocks, (ii) for the second DBTW, the value of (Q−A−1 mod Q) is the same among the SS/PBCH blocks if A resets in the second DBTW, (iii) for the second DBTW, the value of (Q−A−1+A' mod Q) is the same among the SS/PBCH blocks if A does not reset in the second DBTW. A' is the final index in the first DBTW.

For A in DBTW1 or DBTW2, A is an index of the candidate SSB position in DBTW1 which is indicated by (i) the index of the DMRS scrambling sequence transmitted in a PBCH of a corresponding SS/PBCH block and (ii) three bits in the MIB. Q is either provided by ssb-PositionQCL-r17 in SIB3 or SIB4 or, if ssb-PositionQCL-r17 is not provided, obtained from 2 bits in a MIB provided by a SS/PBCH block or purely from the 2 bits the SIB1 which is QCL'ed with the SSB, e.g., in ServingCellConfigCommonSIB. Similarly, the indication of the candidate SB index in DBTW1 or DBTW2 can be transmitted in PBCH or SIB1 via a single bit, and then the frame timing can also be determined. The timing determination of whether the UE is monitoring the first or the second DBTW can be explicitly indicated using 1 bit, e.g., subCarrierSpacingCommon.

Figure 10:
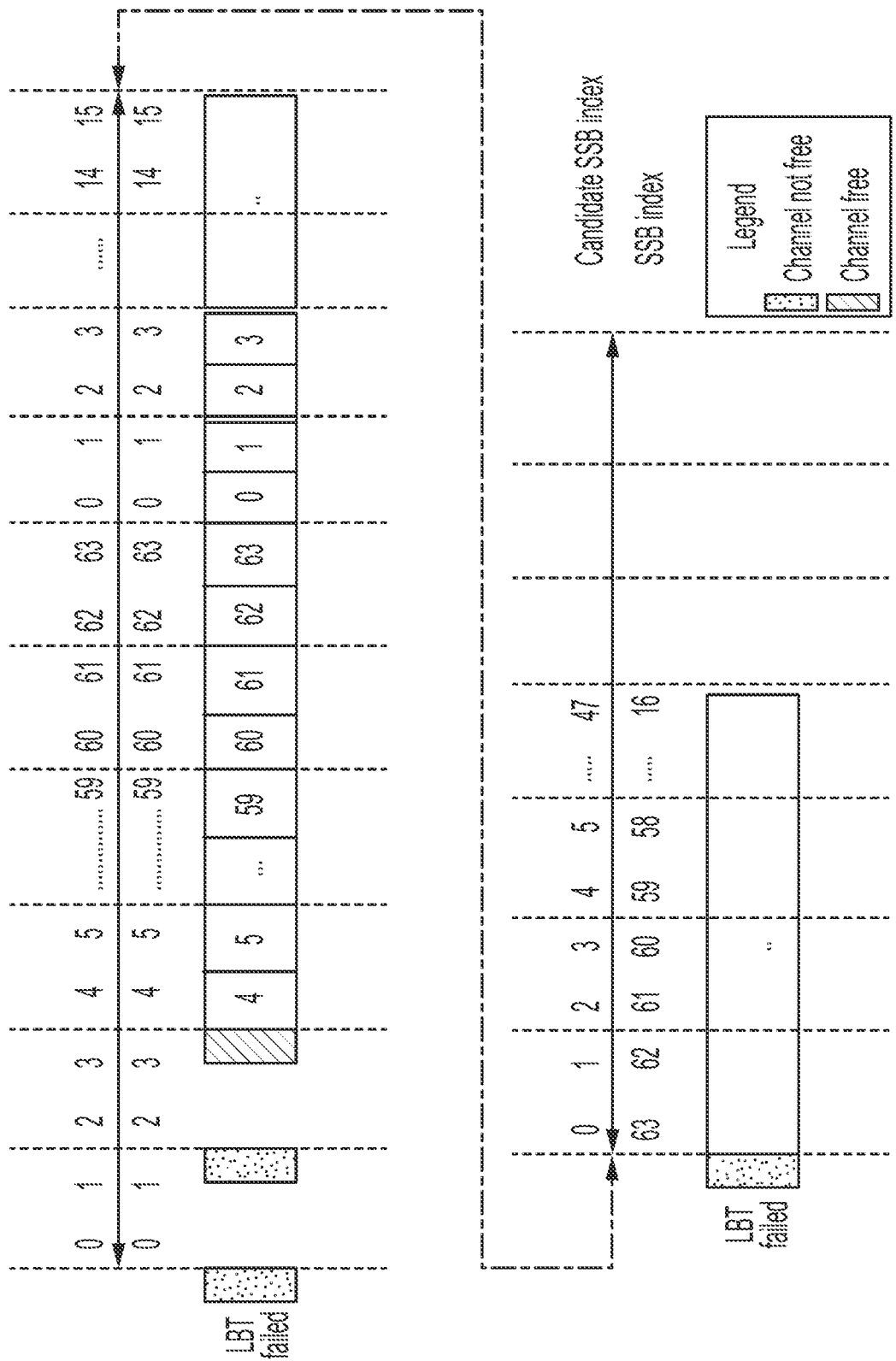
FIG. 10 is a DBTW timing diagram, according to an embodiment of the present disclosure.
Figure 11:
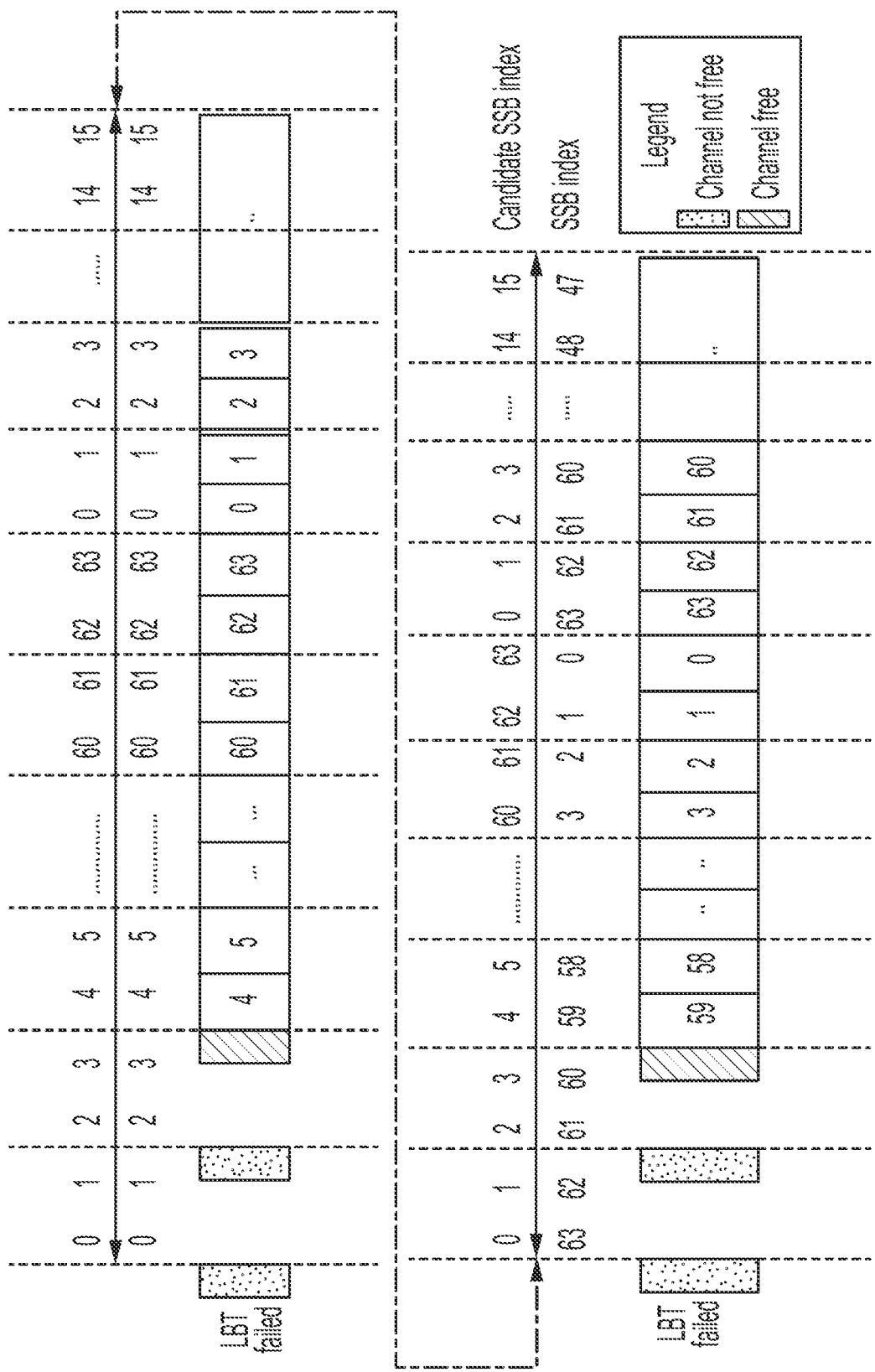
FIG. 11 is a DBTW timing diagram, according to an embodiment of the present disclosure.

The concept of reversing the order of the SSB indexes may be implemented in Option 1 and Option 2, as illustrated in FIGS. 10 and 11.

The candidate SSB index within the DBTW may continue increasing without wrapping around. The candidate SSB index across DBTW's may or may not reset. For FIG. 10, the flip SSB index takes place in DBTW2 to give more channel access opportunities to lower SSB indexes, in contrast to DBTW1. For Q=64, a UE assumes that SS/PBCH blocks in a serving cell that are within a same super discovery burst transmission window or across super discovery burst transmission windows are quasi co-located with respect to average gain, QCL-TypeA, and QCL-TypeD properties, when applicable, if the following conditions are met: (i) for the first DBTW, the value of A is the same among the SS/PBCH blocks, and (ii) for the second DBTW, the value of Q−A−1 is the same among the SS/PBCH blocks.

For general Q, 32<Q<64 the conditions are: (i) for the first DBTW, the value of (A mod Q) is the same among the SS/PBCH blocks, (ii) for the second DBTW, the value of (Q−A−1 mod Q) is the same among the SS/PBCH blocks if A resets in the second DBTW, (iii) for the second DBTW, the value of (Q−A−1+A' mod Q) is the same among the SS/PBCH blocks if A does not reset in the second DBTW. A' is the final index in the first DBTW.

For FIG. 11, for the combination of Option 2 and Option 3, the same rules as those listed above apply to determine the SSB index from the received candidate SSB. index.

Figure 12:
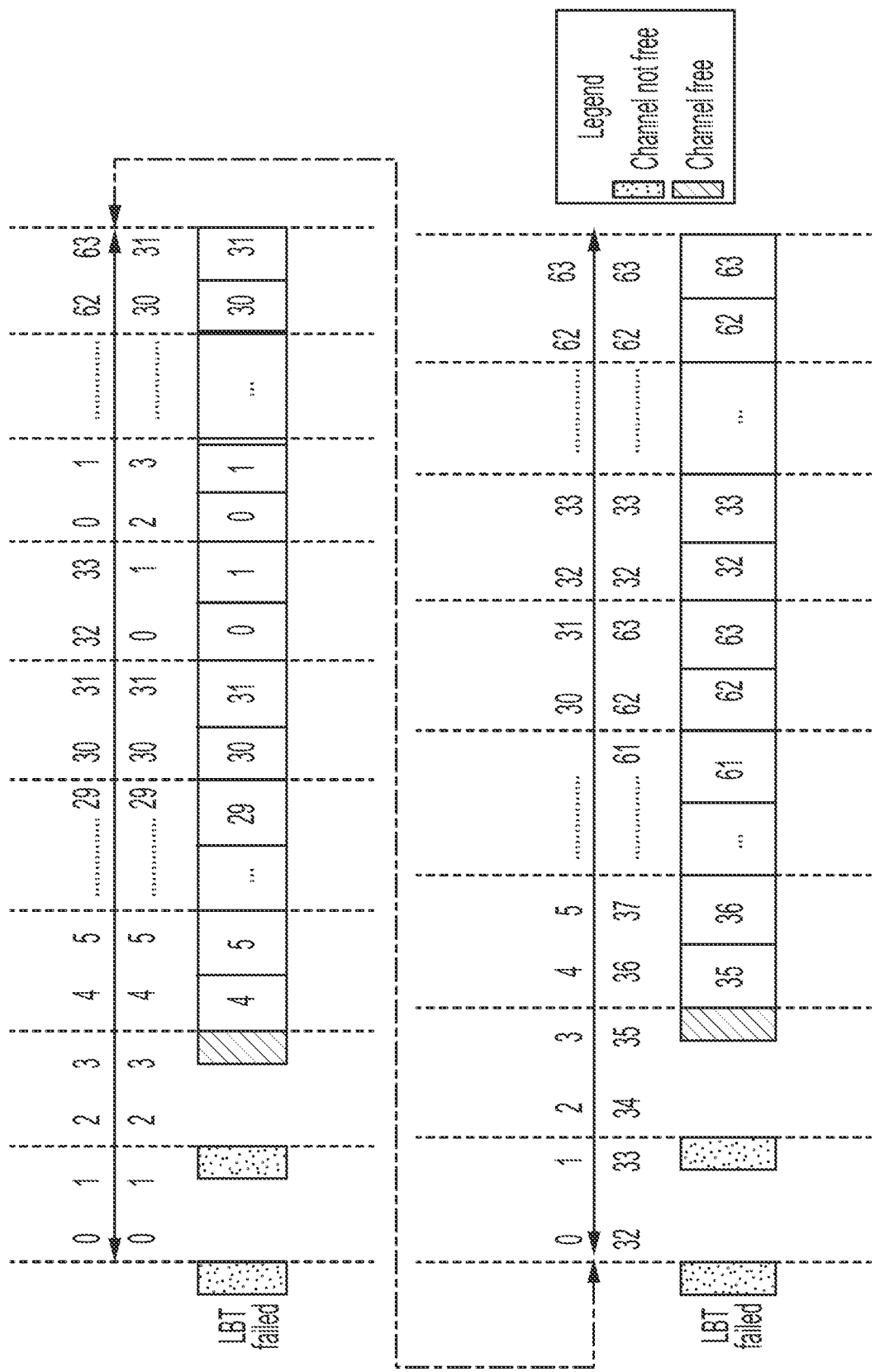
FIG. 12 is a DBTW timing diagram, according to an embodiment of the present disclosure.
Figure 13:
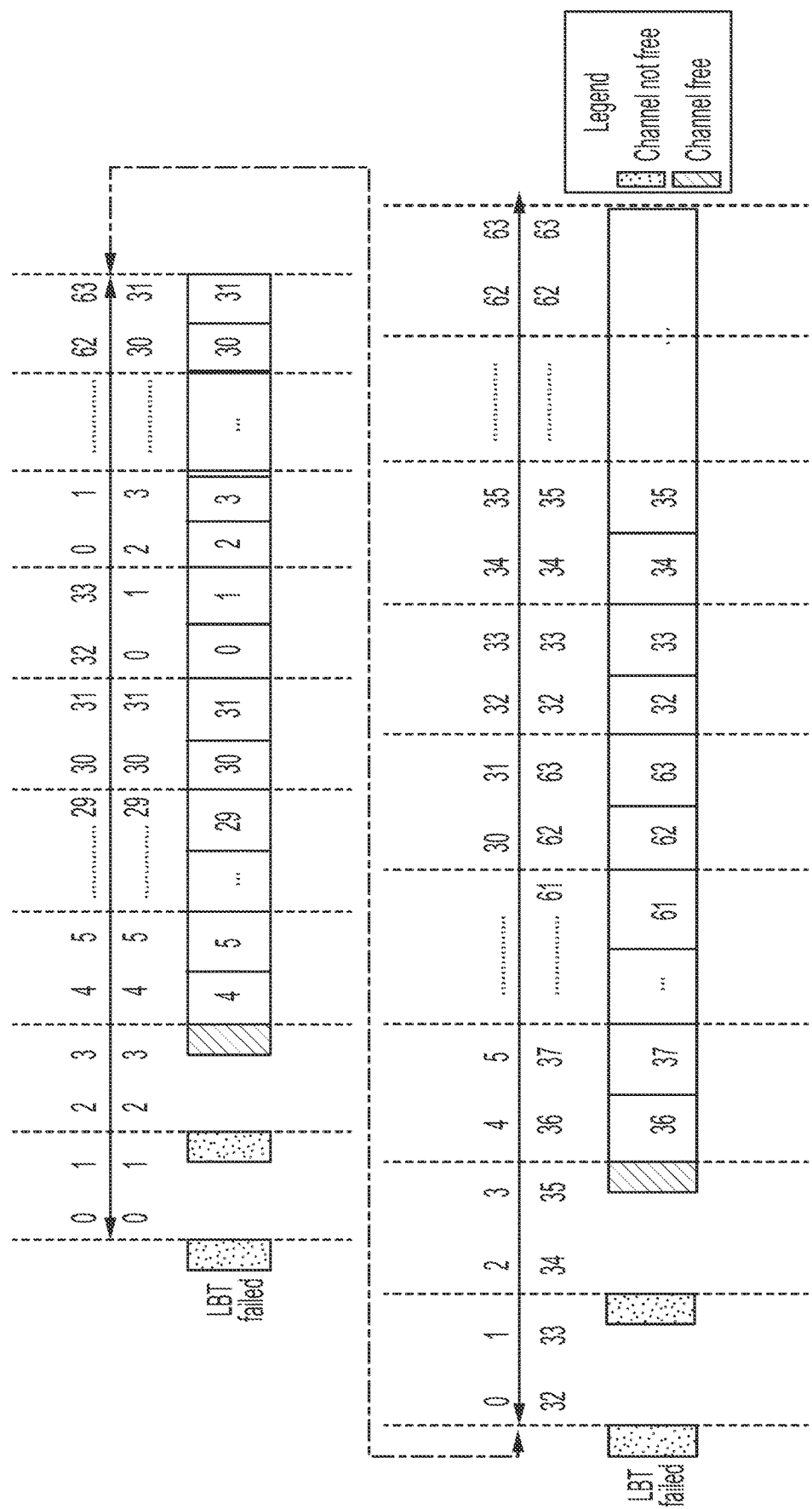
FIG. 13 is a DBTW timing diagram, according to an embodiment of the present disclosure.

In the embodiment referred to as Option 4, a super DBTW may be defined to consist of a first DBTW (which may be referred to as DBTW1) and a second DBTW (which may be referred to as DBTW2), where DBTW1 and DBTW2 together indicate the full set of SSB beams with a maximum of 128 candidate positions. DBTW1 and DBTW2 together contain a maximum of 64 candidate positions and a maximum of 32 SSB indexes. As shown in FIG. 12, when a Q value of 64 is used, a first Discovery Reference Signal (DRS1) has the value Q1=32 and a second Discovery Reference Signal (DRS1) DRS2 has the value Q2=32. In this manner, SSB index 0-31 are swept in DRS1 as in Rel-16 NRU whereas SSB index 32-63 are swept in DRS2 as in Rel-16 NRU. In Option 4, when Q=64, the Q is split into Q1 for window 1 and Q2 for window 2, where Q1 and Q2 are 32, and the legacy Rel-16 DRS framework applies to Q1 and Q2. The UE may monitor both DBTW1 and DBTW2 to complete the entire SSB beam sweeping of Q SSB indexes. The UE assumes that SS/PBCH blocks in a serving cell that are within the same DBTW of the super discovery burst transmission window or across the same DBTW of the super discovery burst transmission windows are quasi co-located with respect to average gain, QCL-TypeA, and QCL-TypeD properties, when applicable, if a value of (A mod Q1) in case of DBTW1 or (A mod Q2)+Q1 in case of DBTW2 is same among the SS/PBCH blocks. For A in DBTW1, A is an index of the candidate SSB position in the DBTW1 which is indicated by (i) the index of the DMRS scrambling sequence transmitted in a PBCH of a corresponding SS/PBCH block and (ii) three bits in the MIB. For A in DBTW2, A is an index of candidate SSB position in DBTW2 which is indicated by (i) the index of the DMRS scrambling sequence transmitted in a PBCH of a corresponding SS/PBCH block and (ii) three bits in the MIB. Q is either provided by ssb-PositionQCL-r17 in SIB3 or SIB4 or, if ssb-PositionQCL-r17 is not provided, (i) obtained from two bits in a MIB provided by a SS/PBCH block purely from the three bits of the SIB1 which is QCL'ed with the SSB e.g., in ServingCellConfigCommonSIB, or (ii) provided in an implicit manner. Similarly, the indication of the candidate SB index in DBTW1 or DBTW 2 can be transmitted in the PBCH or in a SIB1 via a single bit, and then the frame timing can also be determined. There are two alternatives in Option 4: (i) allow SSB index repetition in DBTW, or (ii) do not allow SSB index repetition in DBTW, i.e., each SSB index is transmitted once in the DBTW. FIGS. 12 and 13 illustrate this embodiment, with SSB index repetition in DBTW (FIG. 12), and without SSB index repetition in DBTW (FIG. 13). The timing determination of whether the UE is monitoring the first or the second DBTW can be explicitly indicated using 1 bit, e.g., subCarrierSpacingCommon.

For generic Q>64, and for an SCS of 120 kHz, Q can be 80>Q>64, which is within the capability of Options 1 through 4.

For Q>64, and for an SCS of 480 kHz or 960 kHz, one DBTW has sufficient candidate positions to handle the SSB sweeping, due to the short SSB time duration. The existing Rel-16 framework can work, except that either (i) the maximum candidate SSB indexes may be extended beyond 64 or (ii) the existing maximum 64 candidate SSB indexes may be warped around.

The UE may detect the option (e.g., among Option 1 through Option 4) as follows. If the DRS window is off, the first candidate SSB position is always transmitted for non-DRS SSB with MIB or SIB1 indicating the Q value of 0. If the DRS window is on, the first candidate SSB position is always transmitted for DRS with MIB or SIB1 indicating the Q value. If the UE detects SSB in the first candidate SSB position, it can identify the Q value and determine whether DRS is on or not. If the UE does not detect anything in the first candidate SSB position, the UE can assume DRS is on and continue to detect the Q in the next candidate SSB positions.

In some embodiments, DBTW indication, Q signaling and the signaling of candidate SSB indexes may be performed as follows. A DBTW indication may be communicated using one of four methods, referred to below as Methods 1 through 4, to indicate enabled or disabled DBTW for both IDLE and CONNECTED mode UEs, for both the initial access case and the non-initial access case. In Method 1, different synchronization rasters may be used depending on whether DBTW is enable or disabled (in the initial access case). In Method 2, a PBCH indication may be used or the DBTW indication may be indicated jointly with a Q indicator (in the initial access case). In Method 3, SIB2 or another SIB indication may be used (in the non-initial access case). In Method 4, configuration may be accomplished via UE-specific Radio Resource Control (RRC) signaling (in the non-initial access case).

For Method 1, two separate sets of Global Synchronization Channel Number (GSCN) or Absolute Radio-Frequency Channel Number (ARFCN) values may be defined, where one set corresponds to the case of SSB sweeping transmissions with disabled DBTW while the other set corresponds to the case of SSB sweeping transmissions with enabled DBTW, such that the UE is informed whether DBTW is enabled or disabled prior to the initial access procedure. The embodiment may be practiced by defining new applicable SS raster entries per operating band e.g., by changing Table 5.4.3.3-1 of Technical Specification (TS) 38.104 v15.1.0. This table is shown in FIG. 14, which shows 38.104 v15.7.0—Table 5.4.3.1-1: GSCN parameters for the global frequency raster.

Figure 16:
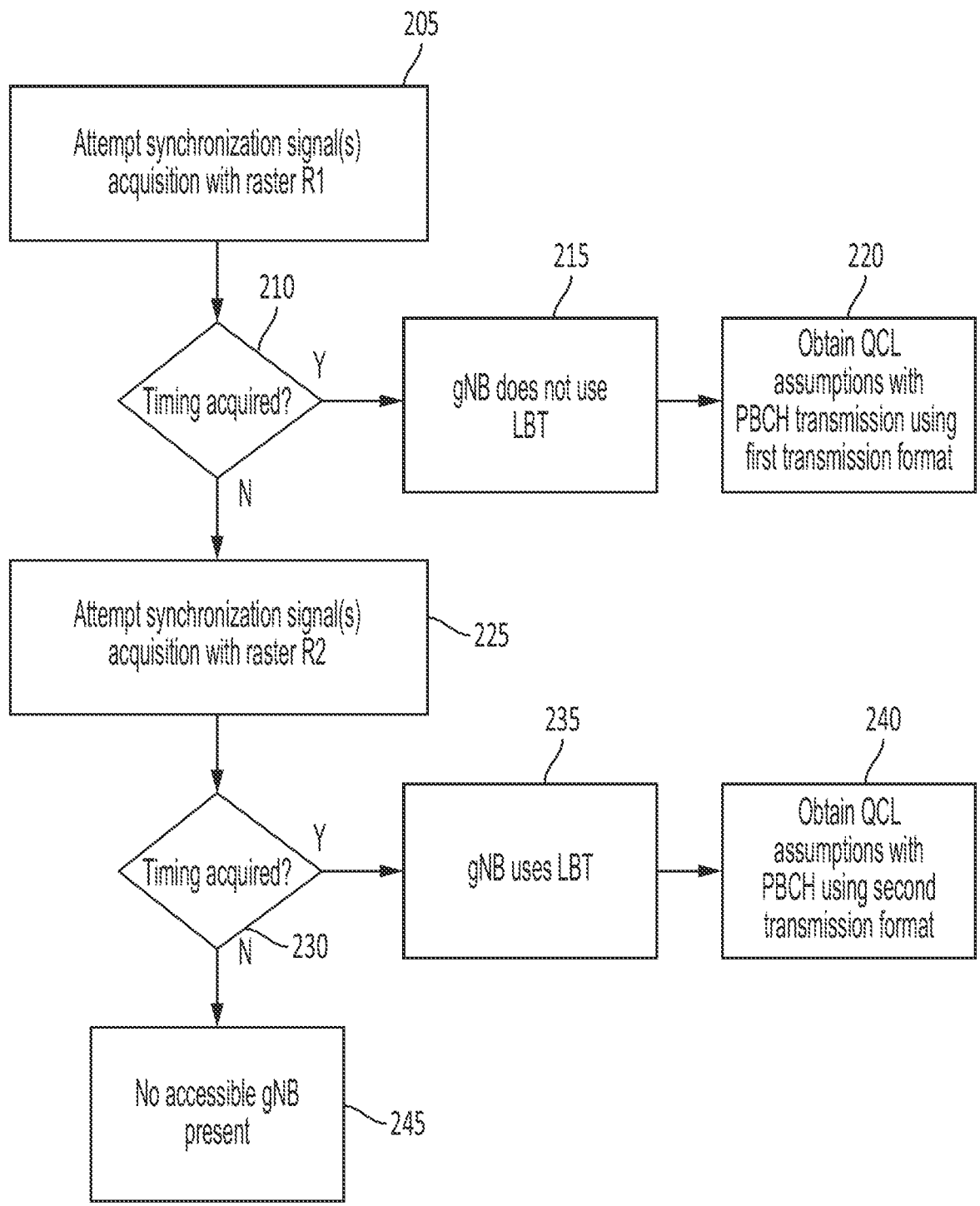
FIG. 16 is a flow chart, according to an embodiment of the present disclosure.

One example of such an embodiment is shown in the table of FIG. 15, for which it is assumed that n261 is an unlicensed band. In a region where the local regulations do not mandate LBT, the gNB can configure SSB transmissions with DBTW or without DBTW, depending on a set of conditions, e.g., the interference measurements at gNB, and the specific gNB implementation. In the original table from 38.104, a UE cannot distinguish whether DBTW is on or off from the NR band number and the SSB SCS. In the table of FIG. 15 (which shows candidate changes to 38.104 v15.4.0—Table 5.4.3.3-2), new entries for GSCN have been added to differentiate the case with and without a DBTW. For example, as in the bold text, for band n261 and a SSB SCS of 120 kHz, the original set of GSCN 22446-<1>-22492 is divided into two sets of GSCN ranges: set 1, which is 22446-<2>-22491 and set 2, which is 22447-<2>-22492, where set 1 is for SSB transmissions without DBTW (LBT) and set 2 is for SSB transmissions with DBTW (LBT). Thus, the UE can detect whether the DBTW is on or off in the n261 band via the set 1 or set 2 set of GSCN ranges or values, before performing the initial access procedures. For one of the other unlicensed bands and SSB SCSs, a similar way of dividing the original combinations of (i) GSCN ranges or values for this unlicensed band and (ii) SSB SCS values, into two sets of GSCN ranges or values can be used to implicitly indicate whether DBTW (LBT) is on or not. FIG. 16 is a flow chart illustrating this embodiment. At 205, the UE attempts to acquire one or more synchronization signals with a first raster, R1. At 210, the UE determines whether timing has been acquired. If timing has been acquired, then the UE concludes, at 215, that the gNB does not use LBT, and, at 220, the UE obtains QCL assumptions with a PBCH transmission using a first transmission format. If, at 210, the UE determines that timing has not been acquired, then, at 225, the UE attempts to acquire one or more synchronization signals with a second raster, R2. At 230, the UE again determines whether timing has been acquired. If timing has been acquired, then the UE concludes, at 235, that the gNB uses LBT, and, at 240, the UE obtains QCL assumptions with a PBCH transmission using a second transmission format. If, at 230, the UE determines that timing has not been acquired, then, at 245, the UE concludes that no accessible gNB is present. The first transmission format may be the same as SSB burst in FR2 (with SSB index 0 on candidate 0, SSB index 1 on candidate 1, etc.). The second transmission format may be one used for DBTW according to embodiments disclosed herein.

Additionally, the UE can also determine whether DBTW is on or off based on the band number or the ARFCN to determine whether the specific band or ARFCN is licensed or unlicensed spectrum. If the band is a licensed band, the DBTW is off, otherwise it is an unlicensed band, in which DBTW is on in any region in which LBT is mandated. In a region in which LBT is not mandated, the above-described method using different GSCN values may be employed.

The UE may determine whether DBTW is on or off by detecting different GSCN values. Two possible options for how to define the UE capability to accomplish this are shown in the table of FIG. 17.

For Method 2, one spare bit in the MIB or in other fields in the PBCH can be used to indicate whether DBTW is enabled or disabled. As an alternative, one spare bit in the PBCH (other than MIB) may be used to indicate DBTW, such as one bit from the LSB of the System Frame Number (SFN) (4 bits). The following bits (or sets of bits) (numbered (i) through (iv) may be candidates for this use. (i) The sub CarrierSpacingCommon parameter (1 bit): If this bit is used, only one Control Resource Set (CORESET), CORESET #0 SCS corresponding to a SCS of SSB may be allowed. (ii) The LSB of ssb-SubcarrierOffset (4 bit): The usability of this bit may be determined based on synchronization and channel rasters. For example, if the RAN4 synchronization and channel raster design allows the range of Offset to be reduced to 8 values by using 3 bits, this change may free up a bit for indicating whether DBTW is on or off. For example, if the synchronization raster and channel raster are PRB-aligned (k_SSB=0) or synchronization raster may only be a half-PRB shifted to channel raster (k_SSB=6), then up to 3 bits, out of 4 bits, may be borrowed from ssb-SubcarrierOffset. (iii) The dmrs-TypeA-Position parameter (1 bit): If this bit is used, one of pos2 or pos3 may be defined as the default value. (iv) The pdcch-ConfigSIB1 parameter (8 bits): 1 of the 8 bits may be used, e.g., 1 bit from searchSpaceZero in pdcch-ConfigSIB1. For SSB SCS equal to or greater than 120 kHz and Physical Downlink Control Channel (PDCCH) SCS equal or greater than 120 kHz, the most significant bit (MSB) of controlResourceSetZero is not used. Or when {SS/PBCH block, PDCCH} SCS is {120, 120} kHz, CORESET #0 and Type0-PDCCH Common Search Space (CSS) set is configured based on tables in 3GPP TS 38.213. In these tables, some states are reserved; a reserved state may be utilized for indication of DBTW.

For Method 3, at least for the purpose of neighbor cell measurement, e.g., for cell reselection or ANR (Automatic Neighbor Relation), system information e.g., SIB2, can be used to inform the UE that DBTW is enabled or disabled on neighboring cells. For example, the table of SIB2 of FIG. 18 may be extended with a new entry (in bold font in FIG. 18)

showing the DBTW status of each neighboring cells. In another example, the DBTW status can be provided for each listed carrier by using SIB4.

For Method 4, for the purpose of SCell addition for a connected UE, UE-specific RRC signaling in addition to cell-specific RRC signaling may be employed to inform that DBTW is enabled or disabled on each of the S-cells.

Q signaling may be performed as follows. The method employed to indicate candidate QCL relation may be designed to avoid exceeding the limit on PBCH payload size (i.e., 32 bits). In Rel-16 NR-U, 2 bits (i.e., subCarrierSpacingCommon and the least significant bit (LSB) of ssb-SubcarrierOffset) in the MIB were re-purposed to indicate one out of 4 candidate $N_{SSB}^{QCL}$ (=Q, when DBTW is enabled) values (i.e., $\{1, 2, 4, 8\}$). Similarly, some of the following candidate bits (identified as options (i) through (iv)) may be used for candidate Q values (e.g., $\{8, 16, 32, 64\}$ for 2 bits). (i) The subCarrierSpacingCommon parameter (1 bit): If this bit is used, only one CORESET #0 SCS corresponding to an SCS of SSB may be allowed. (ii) The LSB of the ssb-SubcarrierOffset parameter (4 bits): Usability of this bit can be determined based on synchronization and channel rasters. (iii) The dmrs-TypeA-Position parameter (1 bit): If this bit is used, one of pos2 or pos3 can be defined as a default value. (iv) The pdcch-ConfigSIB1 parameter (8 bits): use 1 of the 8 bits, e.g., 1 bit from searchSpaceZero in pdcch-ConfigSIB1. For SSB SCS equal to or greater than 120 kHz and PDCCH SCS equal to or greater than 120 kHz, the MSB of controlResourceSetZero is not used. As an alternative, when {SS/PBCH block, PDCCH} SCS is {120, 120} kHz, CORESET #0 and Type0-PDCCH CSS set is configured based on tables in 3GPP TS 38.213. In these tables, some states are reserved. A reserved state may be utilized for indication of Q. As an alternative to using a bit in the MIB, a SIB1 bit may be employed. In such an embodiment, the UE may blind decode the possible QCL relations of each SIB1.

SSB Candidate Position signaling may be performed as follows. In the current spec, 8 DMRS scrambling sequences+3 bits in PBCH payload can identify at best one of 64 SSB candidate positions. To indicate more than 64 candidate positions, e.g., in case of an SCS of 120 kHz and a DBTW size of 5 ms, 80 candidate positions may be present. In such a situation, one more bit may be used to indicate up to 128 candidate positions. To have 128 positions, one bit may be borrowed from the PBCH (other than from the MIB), e.g., one of 4 LSB bits from the SFN outside the MIB, and one MIB bit may also be borrowed for compensating that LSB bit of the SFN. The following options, numbered (i) through (iv), in the MIB may be possible. (i) The subCarrierSpacingCommon parameter (1 bit): If this bit is used, only one CORESET #0 SCS corresponding to a SCS of SSB should be allowed. (ii) LSB of ssb-SubcarrierOffset parameter (4 bit): Usability of this bit can be determined based on synchronization and channel rasters. (iii) The dmrs-TypeA-Position parameter (1 bit): If this bit is used, one of pos2 or pos3 can be defined as a default value without a need of this bit for indicating. (iv) The pdcch-ConfigSIB1 parameter (8 bits): use 1 of the 8 bits, e.g., 1 bit from searchSpaceZero in pdcch-ConfigSIB1. For SSB SCS equal to or greater than 120 kHz and PDCCH SCS equal or greater than 120 kHz, the MSB of controlResourceSetZero is not used. As another alternative, when {SS/PBCH block, PDCCH} SCS is {120, 120} kHz, CORESET #0 and Type0-PDCCH CSS set is configured based on tables in 3GPP TS.38.213. In these tables, some states are reserved. Reserved state may be utilized for indication of SSB candidate index.

Figure 20:
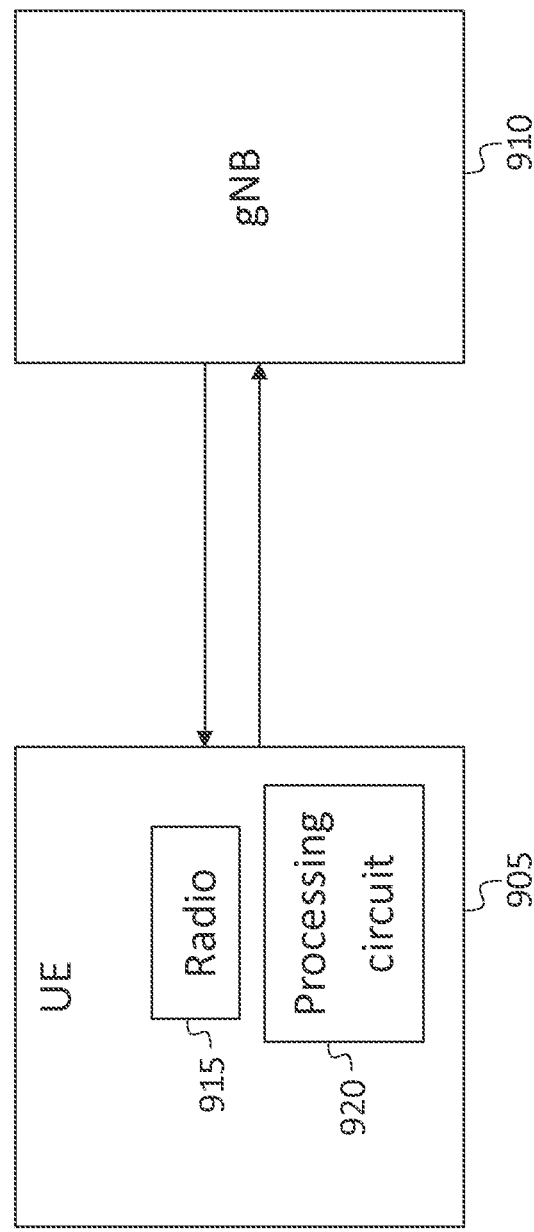
FIG. 20 is a block diagram of a system for wireless communications, according to an embodiment of the present disclosure.

FIG. 19 shows a flowchart of a method. In some embodiments, the method includes, receiving, at 405, by a User Equipment (UE), a signal synchronization block (SSB); determining, at 410, from the SSB, a candidate SSB index; determining, at 415, from a Master Information Block (MIB) of the SSB, a Q value; and determining, at 420, from the Q value, whether a discovery burst transmission window (DBTW) is being employed. FIG. 20 shows a system including a UE 905 and a gNB 910, in communication with each other. The UE may include a radio 915 and a processing circuit (or a means for processing) 920, which may perform various methods disclosed herein, e.g., the method illustrated in FIG. 8. For example, the processing circuit 920 may receive, via the radio 915, transmissions from the network node (gNB) 910, and the processing circuit 920 may transmit, via the radio 915, signals to the gNB 910.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

The terms "processing circuit" and "means for processing" are used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of a system and method for managing a Discovery Burst Transmission Window in a wireless communication system have been specifically described and illustrated herein, many modifications and variations will be apparent to those skilled in the art. Accordingly, it is to be understood that a system and method for managing a Discovery Burst Transmission Window in a wireless communication system constructed according to principles of this disclosure may be embodied other than as specifically described herein. The invention is also defined in the following claims, and equivalents thereof.

What is claimed is:

1. A method, comprising:
receiving, by a User Equipment (UE), a first Signal Synchronization Block (SSB);
decoding a first Physical Broadcast Channel (PBCH) from the first SSB;
determining, from a Master Information Block (MIB) of the first PBCH, a first beam value;
determining from the first beam value whether a discovery burst transmission window (DBTW) is enabled, by:
determining, based on the first beam value being equal to a first value, that the DBTW is enabled; or
determining, based on the first beam value being equal to a second value, that the DBTW is disabled;
determining, from the first PBCH, a first candidate Synchronization Signal/Physical Broadcast Channel (SS/PBCH) block index; and
calculating a first SS/PBCH block index as A mod Q, wherein A is the first candidate SS/PBCH block index and Q is the first beam value.

2. The method of claim 1, further comprising:
receiving, by the UE, a second SSB;
decoding a second PBCH from the second SSB;
determining, from a MIB of the second PBCH, a second beam value; and
determining, from the second beam value, whether a DBTW is being employed.

3. The method of claim 2, comprising:
determining that the second beam value is equal to a predetermined value, and
determining, based on the second beam value being equal to the predetermined value, that a DBTW is not being employed.

4. The method of claim 2, comprising:
determining that the second beam value is not equal to a predetermined value,
determining, based on the second beam value not being equal to the predetermined value, that a DBTW is being employed, and
determining, from the second beam value, a number of beams in the DBTW.

5. The method of claim 2, further comprising obtaining system information, wherein the obtaining is performed based on the determination of whether a DBTW is being employed.

6. The method of claim 2, further comprising:
determining, from the second PBCH, a second candidate SS/PBCH block index; and
determining a second SS/PBCH block index, based on the second candidate SS/PBCH block index and based on the second beam value.

7. The method of claim 6, wherein the determining of the second SS/PBCH block index comprises inferring the second SS/PBCH block index based on an order of candidate SS/PBCH block index values being reversed within a second DBTW, the second DBTW being associated with, and following, a first DBTW.

8. The method of claim 1, further comprising receiving a DBTW-identifying bit associated with the first SSB, the DBTW-identifying bit specifying whether the first SSB is within a first DBTW or a second DBTW of two associated DBTWs.

9. The method of claim 8, wherein the DBTW-identifying bit is a bit of the MIB.

10. The method of claim 8, wherein the DBTW-identifying bit is subCarrierSpacingCommon.

11. The method of claim 1, wherein:
the first beam value is greater than 32, and
the method comprises:
receiving a first plurality of SSBs in a first DBTW; and
receiving a second plurality of SSBs in a second DBTW.

12. A User Equipment (UE), comprising:
a radio; and
a processing circuit,
the processing circuit being configured to:
receive a first signal synchronization block (SSB);
decode a first Physical Broadcast Channel (PBCH) from the first SSB;
determine, from a Master Information Block (MIB) of the first PBCH, a first beam value;
determine from the first beam value whether a discovery burst transmission window (DBTW) is enabled, by:
determining, based on the first beam value being equal to a first value, that the DBTW is enabled; or
determining, based on the first beam value being equal to a second value, that the DBTW is disabled;
determine, from the first PBCH, a first candidate Synchronization Signal/Physical Broadcast Channel (SS/PBCH) block index; and calculate a first SS/PBCH block index as A mod Q, wherein A is the first candidate SS/PBCH block index and Q is the first beam value.

13. The UE of claim 12, wherein the processing circuit is further configured to:
  receive a second SSB;
  decode a second PBCH from the second SSB;
  determine, from a MIB of the second PBCH, a second beam value; and
  determine, from the second beam value, whether a DBTW is being employed.

14. The UE of claim 13, wherein the processing circuit is configured to:
  determine that the second beam value is equal to a predetermined value, and
  determine, based on the second beam value being equal to the predetermined value, that a DBTW is not being employed.

15. The UE of claim 14, wherein the processing circuit is configured to:
  determine that the second beam value is not equal to the predetermined value,
  determine, based on the second beam value not being equal to the predetermined value, that a DBTW is being employed, and
  determine, from the second beam value, a number of beams in the DBTW.

16. The UE of claim 13, wherein the processing circuit is further configured to obtain system information, wherein the obtaining is performed based on the determination of whether a DBTW is being employed.

17. The UE of claim 13, wherein the processing circuit is further configured to:
  determine, from the second PBCH, a second candidate SS/PBCH block index; and
  determine a second SS/PBCH block index, based on the second candidate SS/PBCH block index and based on the second beam value.

18. The UE of claim 17, wherein the determining of the second SS/PBCH block index comprises inferring the second SS/PBCH block index based on an order of candidate SS/PBCH block index values being reversed within a second DBTW, the second DBTW being associated with, and following, a first DBTW.

19. The UE of claim 12, wherein the processing circuit is further configured to receive a DBTW-identifying bit associated with the first SSB, the DBTW-identifying bit specifying whether the first SSB is within a first DBTW or a second DBTW of two associated DBTWs,
  wherein the DBTW-identifying bit is subCarrierSpacingCommon.

20. A User Equipment (UE), comprising:
  a radio; and
  means for processing,
  the means for processing being configured to:
    receive a signal synchronization block (SSB);
    decode a Physical Broadcast Channel (PBCH) from the SSB;
    determine, from a Master Information Block (MIB) of the PBCH, a beam value; and
    determine, from the beam value, whether a discovery burst transmission window (DBTW) is enabled, by:
      determining, based on the beam value being equal to a first value, that the DBTW is enabled; or
      determining, based on the beam value being equal to a second value, that the DBTW is disabled.

* * * * *